(12) United States Patent
Takagi

(10) Patent No.: US 7,238,033 B2
(45) Date of Patent: Jul. 3, 2007

(54) APPARATUS HAVING CARD HOLDING MECHANISM

(75) Inventor: Kazuya Takagi, Yokohama (JP)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/221,214

(22) Filed: Sep. 7, 2005

(65) Prior Publication Data

US 2006/0063402 A1 Mar. 23, 2006

Related U.S. Application Data

(63) Continuation of application No. PCT/JP2004/002963, filed on Mar. 8, 2004.

(30) Foreign Application Priority Data

Mar. 7, 2003 (JP) .............................. 2003-061765

(51) Int. Cl.
*H05K 1/00* (2006.01)

(52) U.S. Cl. ..................................... 439/76.1

(58) Field of Classification Search ............... 439/76.1, 439/159, 630, 157, 329, 330, 331, 360; 361/737, 361/756, 752; 235/486, 441
See application file for complete search history.

(56) References Cited

U.S. PATENT DOCUMENTS 6,275,383 B1 * 8/2001 Bohm .......................... 361/752
6,766,952 B2 * 7/2004 Luu ............................ 235/451

FOREIGN PATENT DOCUMENTS

JP 2000-253119 9/2000
JP 2001-251402 9/2001

* cited by examiner

*Primary Examiner*—Alexander Gilman
(74) *Attorney, Agent, or Firm*—Harrington & Smith, PC

(57) ABSTRACT

There is provided an apparatus having a card holding mechanism which can hold two cards at the same time. The apparatus has a card holding mechanism comprising:
a first card housing section which can hold one end of a first card,
a second card housing section which can hold one end of a second card, and
a sliding holding section which can hold the end opposite to the one end of the first card housed in the first card housing section and the end opposite to the one end of the second card housed in the second card housing section simultaneously.

18 Claims, 17 Drawing Sheets

APPARATUS HAVING CARD HOLDING MECHANISM

This application is a U.S. Continuation Application under 35 USC 371 of International Application PCT/JP2004/002963 filed 8 Mar. 2004.

BACKGROUND OF THE INVENTION (i) Field of the Invention

This invention relates to an apparatus having a card holding mechanism, particularly, a card holding mechanism which can hold two cards at the same time.

(ii) Description of the Related Art

Of electronics including portable telephones and hone video cameras, some are operated with cards housed and held therein. For example, some portable telephones are operated with a data storage card, such as a SIM card (which enables a telephone call when inserted into a portable telephone), MMC card, SmartMedia or memory stick which has data about the contract of a sender, housed and held therein. Heretofore, each of these cards has been held by an independent holding mechanism.

However, when an independent holding mechanism is provided to each card, considerable space is required for the holding mechanisms. This can be a significant problem in reducing the size of the apparatus.

SUMMARY OF THE INVENTION

The present invention has been conceived to solve this problem. An object of the present invention is to provide an apparatus having, particularly, a card holding mechanism which can hold two cards in housing sections simultaneously. The present invention also provides various functions for improving ease of use of this holding mechanism.

To achieve the above object, the present invention has a card holding mechanism comprising:

a first card housing section which can hold one end of a first card, a second card housing section which can hold one end of a second card, and a sliding holding section which can hold the end opposite to the one end of the first card housed in the first card housing section and the end opposite to the one end of the second card housed in the second card housing section simultaneously.

Further, the present invention has a card holding mechanism comprising:

a first card housing section having a holding section which holds one end of a first card, a second card housing section having a holding section which holds one end of a second card, and a sliding holding section which can hold the end opposite to the one end of the first card housed in the first card housing section and the end opposite to the one end of the second card housed in the second card housing section simultaneously, the sliding holding section can slide among:

a first position at which the sliding holding section holds the opposite end of the first card housed in the first card housing section and also holds the opposite end of the second card housed in the second card housing section, a second position at which the sliding holding section leaves the second card housing section open to make it possible to house the second card while holding the opposite end of the first card housed in the first card housing section, and a third position at which the sliding holding section leaves the first card housing section open to make it possible to house the first card while holding the opposite end of the second card housed in the second card housing section.

Further, the present invention has a card holding mechanism comprising:

a first card housing section having a nearly concave shape and having an opening for holding one end of a first card, a second card housing section having a nearly concave shape and having an opening for holding one end of a second card, and a sliding holding member which is positioned above the first card housing section and the second card housing section and provided independently of the first card housing section and the second card housing section and which can hold the end opposite to the one end of the first card housed in the first card housing section and the end opposite to the one end of the second card housed in the second card housing section simultaneously, the sliding holding member can slide between the first card housing section and the second card housing section, nearly parallel to the one end and opposite end of the first card and nearly vertically to the one end and opposite end of the second card, and the sliding holding member can slide among:

a first position at which the sliding holding member holds the opposite end of the first card housed in the first card housing section and also holds the opposite end of the second card housed in the second card housing section, a second position at which the sliding holding member leaves the second card housing section open to make it possible to house the second card while holding the opposite end of the first card housed in the first card housing section, and a third position at which the sliding holding member leaves the first card housing section open to make it possible to house the first card while holding the opposite end of the second card housed in the second card housing section. By these constitutions, two cards can be held simultaneously In the above apparatus, the sliding holding member may hold the opposite end of the first card over a full width and hold the opposite end of the second card only over a partial width. Thereby, the first card in particular can be held securely from both sides thereof.

Further, in the above apparatus, the sliding holding member may be chamfered along the direction in which the first card is inserted into the opening of the first card housing section. Thereby, the sliding holding member can be inserted into or removed from the card housing section more smoothly.

Further, in the above apparatus, a portion of an area other than an area to which the fingers of a user mostly apply force when the user slides the sliding holding member may be omitted from the sliding holding member. Thereby, it can be prevented that the sliding holding member is slid involuntarily.

Further, in the above apparatus, the edges of the opening of the first card housing section may protrude in a curved form in the direction opposite to the direction in which the first card is inserted into the opening of the first card housing section. Thereby, the first card can be inserted into the opening of the first card housing section smoothly.

Further, in the above apparatus, the sliding holding member may be provided with a supporting section which supports the underside of the sliding holding member, on the underside of the sliding holding member. Thereby, breakage of the apparatus can be prevented.

Further, in the above apparatus, the sliding holding member may have antislips.

Further, in the above apparatus, the sliding holding member may be held on the apparatus at three spots which form a nearly triangular shape. Thereby, a tolerance for size can be rendered relatively large. In addition, sliding of the sliding holding member can be controlled easily, and the operation of the sliding holding member can be stabilized.

Further, in the above apparatus, the sliding holding member may have curves corresponding to the first, second and third positions, and an elastic member provided on the apparatus may engage each of the curves at the first, second or third position according to sliding of the sliding holding member. Further, the portion between the first and second positions and the portion between the second and third positions may be formed in a curved form. Thereby, force required to slide the sliding holding member can be equalized. Further, in the above apparatus, the curve which engages the elastic member at the first position may be deeper than the curves which engage the elastic member at the second and third positions. Thereby, a given feeling of clicking can be given to a user at each of the first to third positions.

Further, in the above apparatus, the sliding holding member is brought close and attached to the apparatus and may have protrusions which can engage pits provided in a portion of the apparatus when the apparatus is assembled. Thereby, the sliding holding member can be positioned securely at a predetermined position of the apparatus.

Further, the above apparatus may be constituted such that the sliding holding member has a wall which is in direct contact with a predetermined wall of the second card housed in the second card housing section and can hold the card in the second card housing section by predetermined force, except for at least when the sliding holding member is positioned at the second position, in the direction perpendicular to a slide face which can be formed by the sliding holding member when the sliding holding member slides, and on the wall, a flat section parallel to the sliding direction of the sliding holding member and a retracted section which is inclined in a direction which moves away from the predetermined wall of the second card when the sliding holding member is slid from the second position are formed continuously. Further, the boundary between the flat section and the retracted section may be gently continuous. Thereby, the second card can be held in the second card housing section by predetermined force.

Further, the above apparatus may be constituted such that the sliding holding member is brought close and attached to the apparatus, in the direction perpendicular to a slide face which can be formed by the sliding holding member when the sliding holding member slides, and the apparatus has a horizontal portion extending parallel to the slide face at a position remote in the perpendicular direction from the apparatus, and after the sliding holding member is brought close to the apparatus in the perpendicular direction, the sliding holding member is slid in the sliding direction, whereby the sliding holding member is sandwiched and held between the horizontal portion and the apparatus.

Further, the above apparatus may be constituted such that it apparatus has an elastic member which can be elastically displaced in the perpendicular direction, the elastic member collides with the sliding holding member and is displaced in the perpendicular direction when the sliding holding member is brought close to the apparatus in the perpendicular direction, and then, when the sliding holding member is slid and sandwiched between the horizontal portion and the apparatus, the elastic member disengages from the sliding holding member and returns to the original position so as to prevent the sliding holding member from sliding back in the sliding direction.

DETAILED DESCRIPTION OF THE PREFERRED EMBODIMENTS

Hereinafter, a description will be given to an example of application of a card holding mechanism according to one embodiment of the present invention to a portable telephone in particular. However, this card holding mechanism is not limited to the portable telephone and is also applicable to various other devices such as a home video camera. Thus, the following embodiment does not intend to limit the present invention to the portable telephone.

1. Assembling

Figure 1:
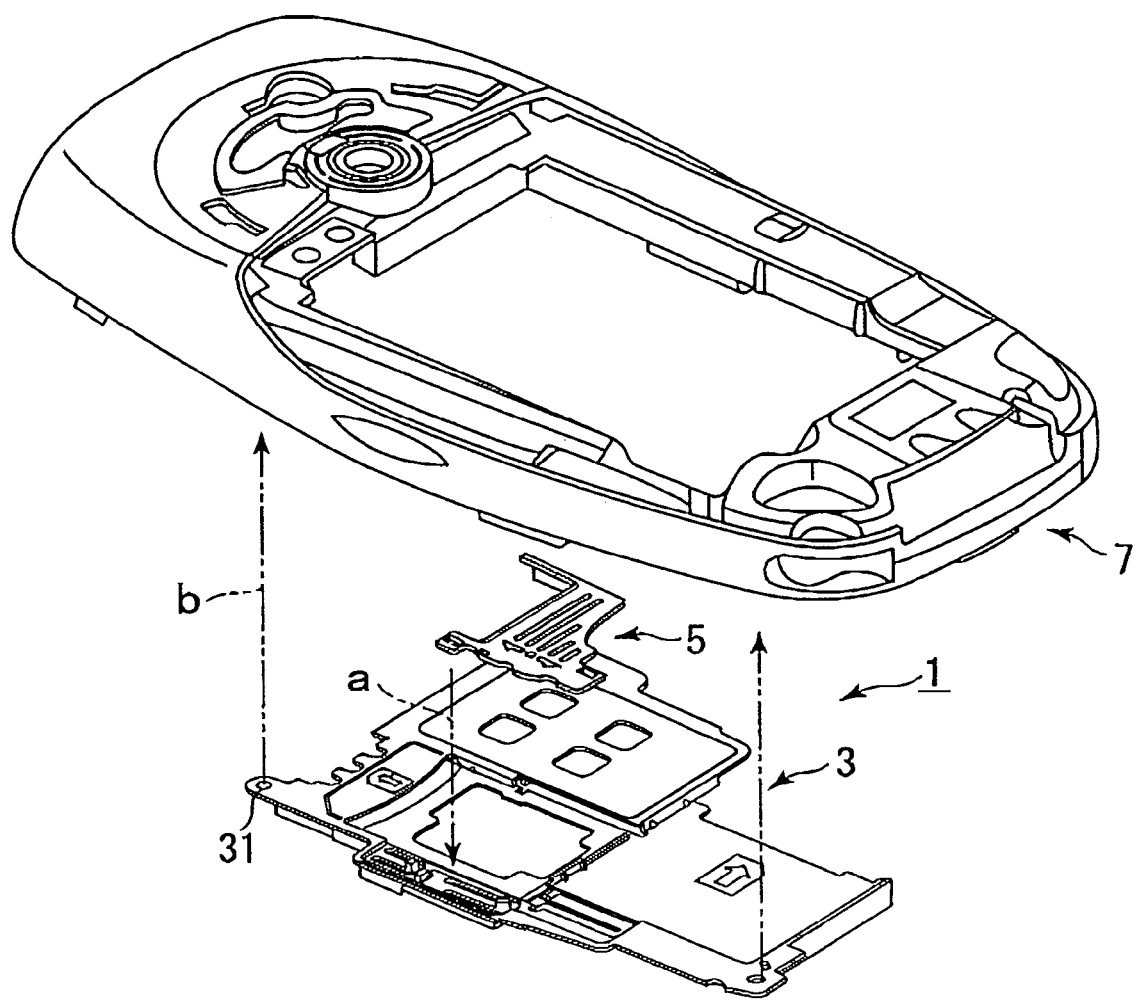
FIG. 1 is a perspective diagram showing some components of a portable telephone having a card holding mechanism.

FIG. 1 shows a perspective view of some components of a portable telephone having a card holding mechanism. The card holding mechanism 1 primarily comprises a card housing 3 and a sliding holding member 5 and further comprises a rear cover 7 of the portable telephone and the main body of the portable telephone as peripheral components. Further, from the viewpoint of the card holding mechanism, it can be said that the rear cover 7 is intended solely to prevent the sliding holding member 5 from coming off the card housing 3.

A method for assembling the portable telephone will be described briefly. First, the sliding holding member 5 is attached to the card housing 3 in the direction of an arrow (a) shown in FIG. 1. Then, the card housing 3 is attached to the rear cover 7 of the portable telephone in the direction of an arrow (b) shown in FIG. 1 and fixed to the rear cover 7 by use of screw holes 31 and screws (not shown) Finally, the rear cover 7 is fixed to the main body (refer to FIG. 2) of the portable telephone in which major electrical modules are placed, in the same direction as the arrow (a) shown in FIG. 1. The direction in which the sliding holding member 5 is attached to the card housing 3 or the direction in which the card housing 3 is attached to the rear cover 7 of the portable telephone is perpendicular to a slide face which can be formed by the sliding holding member 5 when it slides.

2. Housing and Holding of SIM Card and MMC Card

Figure 2:
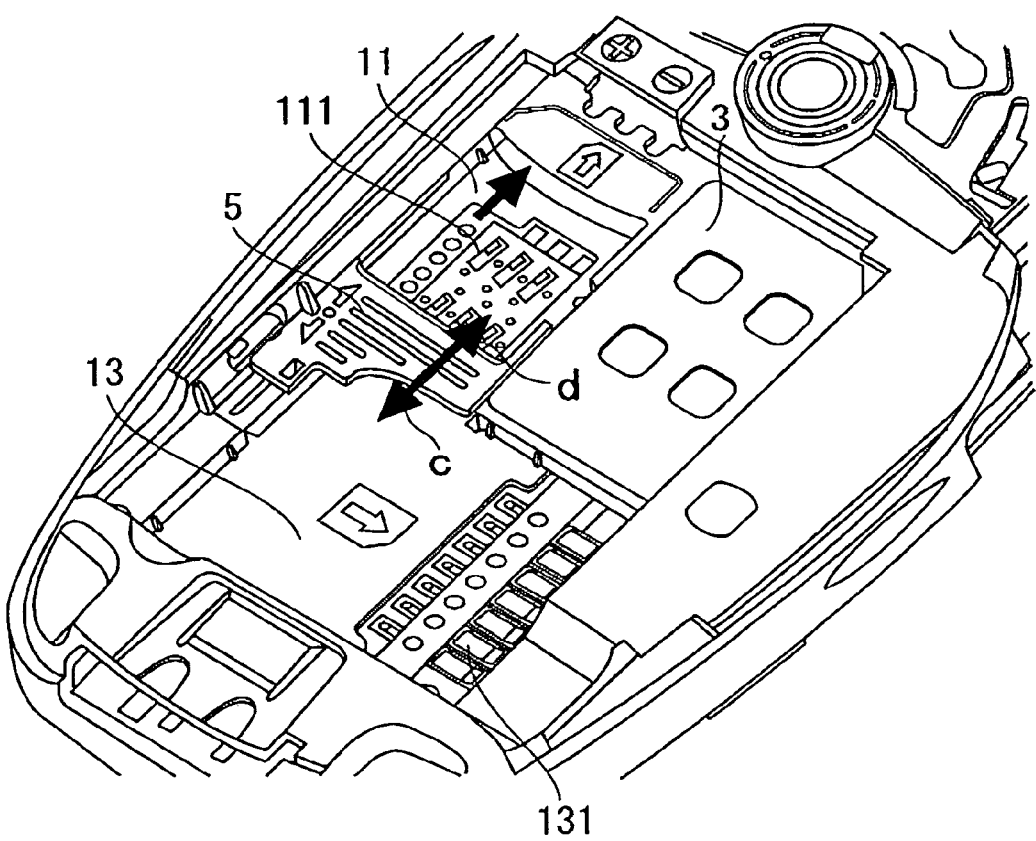
FIG. 2 is a perspective view of the back side of the portable telephone.

FIG. 2 shows a perspective view of a fully assembled portable telephone, especially the back side thereof. It can be seen that a nearly concave SIM card slot 11 and a nearly concave MMC card slot 13 are formed. These slots 11 and 13 can house a SIM card 110 and an MMC card 130 (refer to FIGS. 3 and 4), respectively. Thus, this portable telephone can house two cards at the same time. When the SIM card and the MMC card are housed in the SIM card slot 11 and the MMC card slot 13, terminals (not shown) exposed on the surfaces of the SIM card and the MMC card can be electrically connected to corresponding terminals 111, 131 and the like (exposed in the main body of the portable telephone) The sliding holding member 5 can slide freely between the SIX card slot 11 and the MMC card slot 13 in given sliding directions, i.e., in the directions of arrows (c) and (d) shown in FIG. 2. The position of the sliding holding member 5 in the card housing 3 shown in FIG. 2 will be specifically referred to as "home position" for the sake of convenience.

Figure 3:
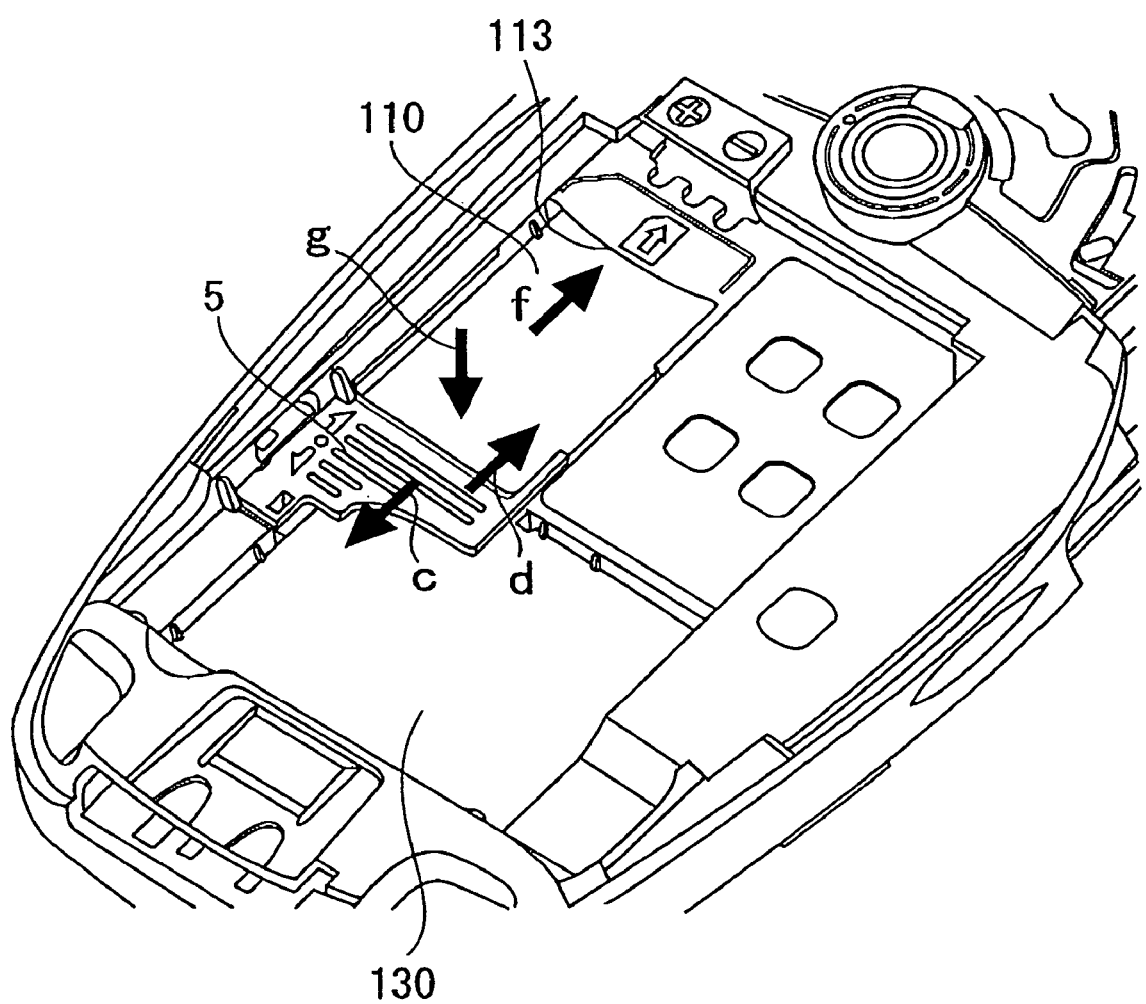
FIG. 3 is a diagram illustrating a method of housing a SIM card in a SIM card slot.

A method of housing the SIM card in the SIM card slot will be described in detail with reference to FIG. 3. First, the sliding holding member 5 positioned at the home position is slid in the direction of the arrow (c) shown in FIG. 3 so as to make the SIM card slot 11 fully opened. The position of the sliding holding member 5 in the card housing 3 at that time will be referred to as "SIM card slot opened position" for the sake of convenience. Then, the front end of the SIM card 110 is inserted into the opening 113 (shown clearly in FIG. 6) of the SIM card slot 11 at an angle from above, i.e., in the direction of an arrow (f) shown in FIG. 3, and held in that state. Then, the back portion of the SIM card 110 is pressed against the terminals 111 and the like (refer to FIG. 2) exposed in the SIM card slot 11 in the direction of an arrow (g) shown in FIG. 3. Finally, the sliding holding member 5 is slid in the direction of the arrow (d) shown in FIG. 3. To remove the SIM card 110 from the SIM card slot 11, the above procedure is reversed.

Figure 4:
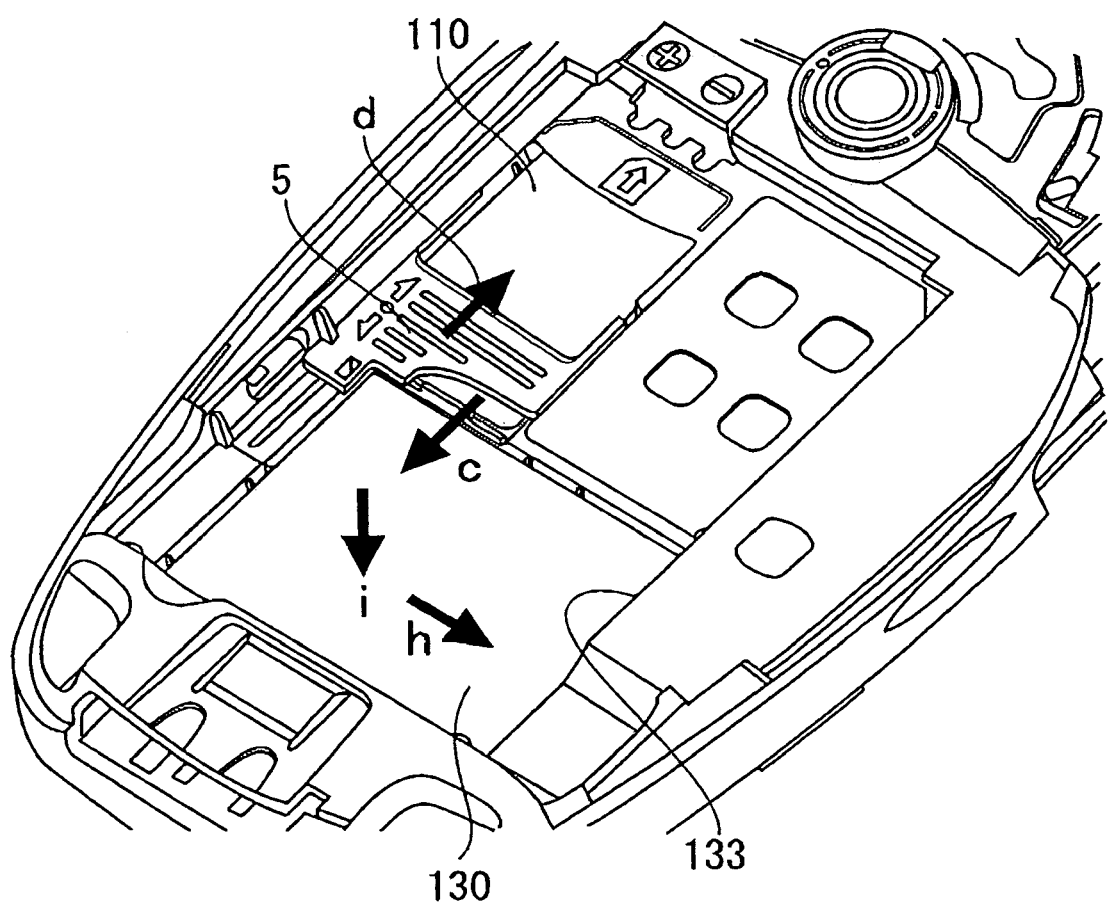
FIG. 4 is a diagram illustrating a method of housing an MMC card in an MMC card slot.

A method of housing the MMC card 130 in the MMC card slot 13 will be described in detail with reference to FIG. 4. First, the sliding holding member 5 positioned at the home position is slid in the direction of the arrow (d) shown in FIG. 4 so as to make the MMC card slot 13 fully opened. The position of the sliding holding member 5 in the card housing 3 at that time will be referred to as "MMC card slot opened position" for the sake of convenience. Then, one end of the MMC card 130 is inserted into the opening 133 of the MMC card slot 13 at an angle from above, i.e., in the direction of an arrow (h) shown in FIG. 4, and held in that state. Then, the other end portion of the MMC card 130 is pressed against the terminals 131 and the like (refer to FIG. 2) exposed in the MMC card slot 13 in the direction of an arrow (i) shown in FIG. 4. Finally, the sliding holding member 5 is slid in the direction of the arrow (c) shown in FIG. 4. At that time, when the SIM card is already housed, care must be taken not to slide the sliding holding member 5 beyond the home position and to the SIM card slot opened position. The reason is that the already housed SIM card 110 may pop out of the SIM card slot if the sliding holding member 5 is slid to the SIM card slot opened position. The same applies to a case where the MMC card is housed first.

Figure 5:
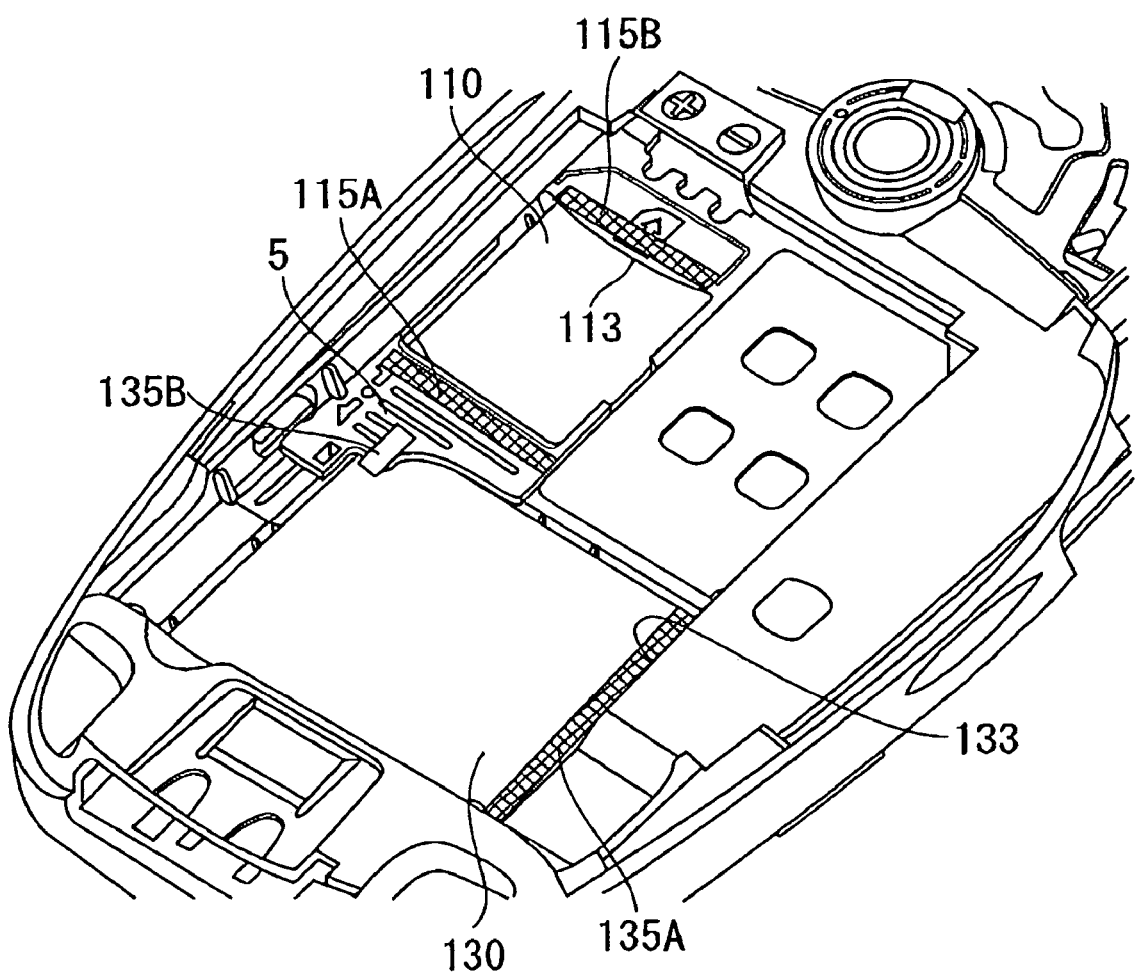
FIG. 5 is a diagram showing where the SIM card and the MMC card are held by a sliding holding member.

As clearly shown in FIG. 5, according to the present invention, the SIM card 110 and the MMC card 130 are held at the same time by the sliding holding member 5 with the member 5 positioned over the cards. More specifically, in the case of the SIM card 110, by sliding the sliding holding member 5 nearly parallel to holding spaces 115A and 115B, the top and under surfaces of the other end of the SIM card 110 can be held in the holding space 115A by the sliding holding member 5 and the SIM card slot 11, respectively, with one end of the SIM card 110 held in the holding space 115B which is the opening 113 of the SIM card slot. As a result, the SIM card 110 is held securely at both ends in the holding spaces 115A and 115B positioned parallel to each other.

Meanwhile, in the case of the MMC card 130, by sliding the sliding holding member 5 nearly vertically to holding spaces 135A and 135B, the top and under surfaces of the other end of the MMC card 130 can be held in the holding space 135B by the sliding holding member 5 and the MMC card slot 13, respectively, with one end of the MMC card 130 held in the holding space 135A which is the opening 133 of the MMC card slot. As a result, the MMC card 130 is held securely at both ends in the holding spaces 135A and 135B positioned parallel to each other.

As is well known, the SIM card 110 has problems of being highly susceptible to thermal deformation and being thin and fragile. According to the present invention, the SIM card 110 can be held stably because the SIM card 110 is held securely at both opposed ends thereof. Meanwhile, since the MMC card 130 is firmer than the SIM card 110 and, unlike the SIM card 110, the MMC card 130 hardly undergoes thermal distortion, it is sufficient that the MMC card 130 is held over a full width 135A only at one end where the terminals 131 and the like are disposed and only over a partial width 135B at the opposed end.

3. Card Housing and Sliding Holding Member

The card housing will be described in detail with reference to FIG. 6 that is a schematic enlarged perspective view of a portion of the card housing.

3-1. Card Housing

1) Overall Constitution

The card housing 3 may be integral-molded from a resin or the like. The card housing primarily comprises an electronic module forming section 30, a SIM card slot forming section 34 which forms nearly all of the SIM card slot 11, and an MMC card slot forming section 38 which forms a portion of the MMC card slot 13.

On the back of the electronic module forming section 30, various electronic modules provided in the main body of the portable telephone are disposed when the portable telephone is assembled. After completion of assembling of the portable telephone, a product seal or the like may be placed on the electronic module forming section 30.

The opening 113 into which the SIM card is inserted is formed in the SIM card slot forming section 34 and formed by the upper plate 341 and lower plate 342 of the card housing 3. The edges 343 and 344 of these upper plate 341 and lower plate 342 protrude in a curved form in the direction opposite to the insertion direction of the SIM card so as to further facilitate insertion of the SIM card. These edges 343 and 344 have nearly the same curved shape. In particular, the edge 344 of the lower plate protrudes farther in the direction opposite to the insertion direction of the SIM card than the edge 343 of the upper plate. Thereby, the SIM card can be inserted more smoothly. In the center of the SIM card slot forming section 34, a relatively large hole 345 is formed so as to expose the terminals 111 (refer to FIG. 2) and the like provided in the main boy of the portable telephone. The terminals 111 and the like remain exposed as shown in FIG. 2 through the hole 345, even after the card housing 3 is fixed to the main body of the portable telephone.

The MMC card slot forming section 38 is so constituted that the card housing 3 does not exist in the vicinity of the terminals 131 and the like provided in the main body of the portable telephone so as to expose the terminals 131 and the like. In other words, the card housing 3 forms only nearly a half of the MMC card slot area. Thus, the above opening 133 (described with reference to FIG. 4) into which the MMC card is to be inserted is formed not by (the MMC card slot forming section 38 of) the card housing 3 but by the main body of the portable telephone.

2) Guide Slit and Guide Rail

To hold and guide the sliding holding member 5, a first guide rail 346, a first guide slit 300, a second guide rail 380 and a second guide slit 382 are provided. The guide rails 346 and 380 are formed as mere grooves which do not penetrate the card housing 3. Meanwhile, the guide slits 300 and 382 penetrate the card housing 3. The guide rails and the guide slits have nearly the same length and formed in the sliding direction of the sliding holding member 5.

In particular, the first guide rail 346 is formed at one side of the SIM card slot forming section 34.

The first guide slit 300 is formed by the electronic module forming section 30 and the SIM card slot forming section 34. More specifically, the first guide slit 300 is formed by forming a given opening 303 in a planar direction between a vertical wall 302 of the electronic module forming section 30 and a vertical wall 347 of the SIM card slot forming section 34 and by forming a given opening 305 in a vertical direction by the electronic module forming section 30 positioned at the upper position and the SIM card slot forming section 34 positioned at the lower position. The former opening 303 is useful for facilitating attachment of the sliding holding member 5 to the card housing 3 in the planar direction. Meanwhile, the latter opening 305 is useful for attaching the sliding holding member 5 to the card housing 3 or holding the sliding holding member 5 in the card housing 3.

The second guide rail 380 is formed at one side of the MMC card slot forming section 38.

Although the second guide slit 382 is also formed at one side of the MMC card slot forming section 38, the second guide slit 382 is formed closer to the MMC card slot forming section 38 than to the second guide rail 380. The second guide slit 382 is formed by a flat protruding section 384 which extends along a portion of the second guide rail 380 and the remaining portion of the second guide rail 380 and the MMC card slot forming section 38. More specifically, the second guide slit 382 is formed by forming a given opening 381 in a planar direction between a wall 386 of a portion of the second guide rail 380 and a wall 388 of the flat protruding section and a wall 390 of the MMC card slot forming section 38 and by forming a given opening 383 in a vertical direction by the flat protruding section 384 positioned at the upper position and the MMC card slot forming section 38 positioned at the lower position. The former opening 381 is useful for facilitating attachment of the sliding holding member 5 to the card housing 3 in the planar direction. Meanwhile, the latter opening 383 is useful for attaching the sliding holding member 5 to the card housing 3 or holding the sliding holding member 5 in the card housing 3. Further, although not particularly shown in FIG. 6, the above wall 386 of a portion of the second guide rail 380 may be inclined toward the lower portion of the second guide slit 382 so as to facilitate attachment of the sliding holding member 5 (holding hook 72 to be described later).

The sliding holding member 5 is positioned and held at 4 spots where the first guide rail 346, the first guide slit 300, the second guide rail 380 and the second guide slit 382 are disposed, or at 3 spots that form a nearly triangular shape because the second guide rail 380 and the second guide slit 382 can be considered substantially disposed at the same spot. As a result, a tolerance for size can be rendered relatively large, as compared with a case where the sliding holding member 5 is positioned and held at only 2 spots. Further, it becomes no longer necessary to control the sizes of guide protrusions, guide rails and the like strictly for positioning and holding the sliding holding member, and a tolerance for their sizes is allowed to be relatively large. Therefore, it becomes easy to control sliding of the sliding holding member, and its movement can be stabilized.

Figure 6:
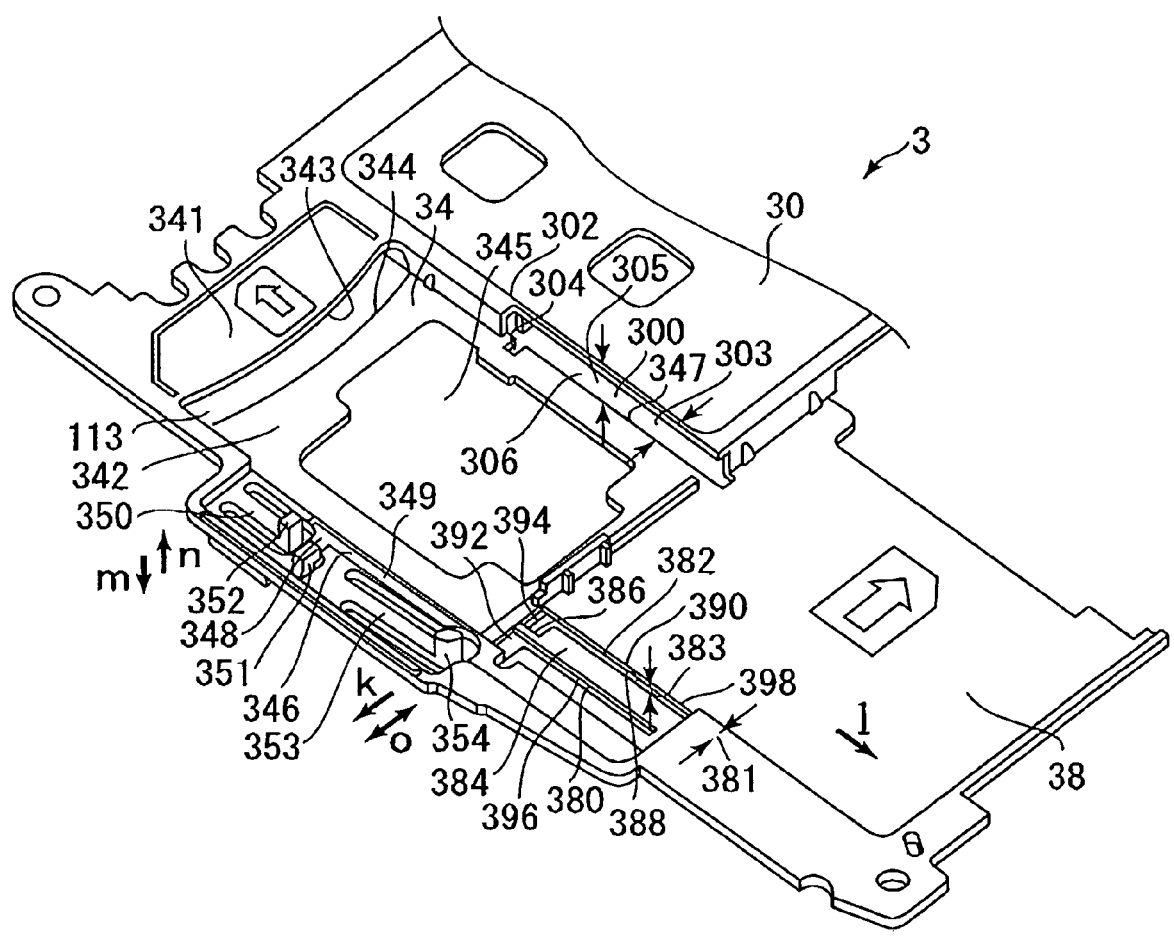
FIG. 6 is a schematic enlarged perspective view of a portion of a card housing.

Portions of these guide rails and guide slits where the sliding holding member 5 is guided first when the sliding holding member 5 is attached to the card housing 3, i.e., attachment guiding sections 348, 304, 392 and 394, are formed in a form that is slightly expanded in a transverse direction (direction of an arrow (k) in FIG. 6). Meanwhile, portions where the sliding holding member 5 is guided thereafter, i.e., sliding guiding sections 349, 306, 396 and 398, are formed in a form that is extended relatively long in a longitudinal direction (direction of an arrow (1) in FIG. 6).

3) Locking Lever and Holding Rib

A locking lever 350 and a holding rib 351 are provided next to the first guide rail 346, particularly, next to the attachment guiding section 348 of the first guide rail 346. The locking lever 350 and the holding rib 351 are provided adjacent to each other.

The locking lever 350 can be elastically displaced in a vertical direction (that is, a direction perpendicular to a slide face that can be formed by the sliding holding member when it slides. The same will apply to the following description.), i.e., in the direction of an arrow (m) in FIG. 6. Along with this displacement, a front-side locking tab 352 provided at the top of the locking lever 350 moves up and down. The locking lever 350 is displaced downward when the sliding holding member 5 is attached to the card housing 3, while the locking lever 350 returns to the original position after the sliding holding member 5 is completely attached to the card housing 3. By this movement, the locking lever 350 and the front-side locking tab 352 prevent the sliding holding member 5 from sliding back to the position where it is detached from the card housing 3, after the sliding holding member 5 is completely attached to the card housing 3. Further, although not particularly shown in FIG. 6, a back-side locking tab is provided at the other side of the locking lever 350 which is opposite to the side where the front-side locking tab 352 is provided, and after completion of assembling of the portable telephone, this back-side locking tab contacts a portion of the main body of the portable telephone so as to prevent the front-side locking tab 352 from moving downward again. Accordingly, it is also prevented that the sliding holding member 5 slides back to the position where it is detached from the card housing 3.

The holding rib 351 extends vertically from the card housing 3, and its top extends in a horizontal direction (that is, a direction parallel to the slide face that can be formed by the sliding holding member 5 when it slides. The same will apply to the following description) toward the inside of the card housing 3. By such a shape, when the sliding holding member 5 is attached to the card housing 3, a portion of the sliding holding member 5 is positioned under the portion extending in the horizontal direction, that is, a portion of the sliding holding member 5 is inserted between the card housing 3 and the holding rib 351 so as to prevent the sliding holding member 5 from falling off the card housing 3.

4) Spring Lever

A spring lever 353 is provided next to the guide rail, particularly, next to the sliding guiding section of the first guide rail 346. The spring lever 353 can be elastically displaced at least in a horizontal direction, i.e., in the direction of an arrow (o) shown in FIG. 6. This spring lever 353 is helpful for holding the sliding holding member 5 at a predetermined position after the sliding holding member 5 is attached to the card housing 3. That is, a circular tab 354 provided at the top of the spring lever 353 engages a predetermined portion of the sliding holding member 5 so as to hold the sliding holding member 5 at the predetermined position by predetermined force.

3-2. Sliding Holding Member

Figure 7:
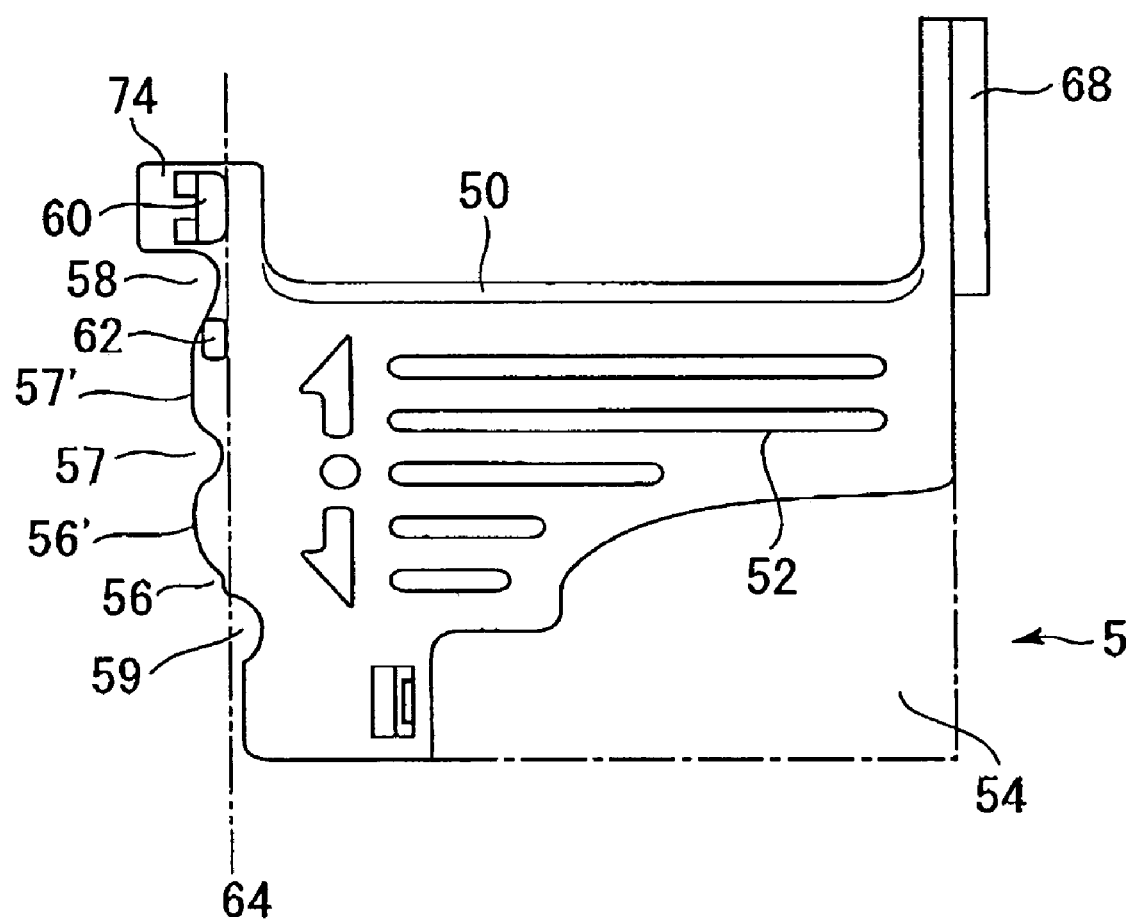
FIG. 7 is a plan view of the front side of the sliding holding member.
Figure 8:
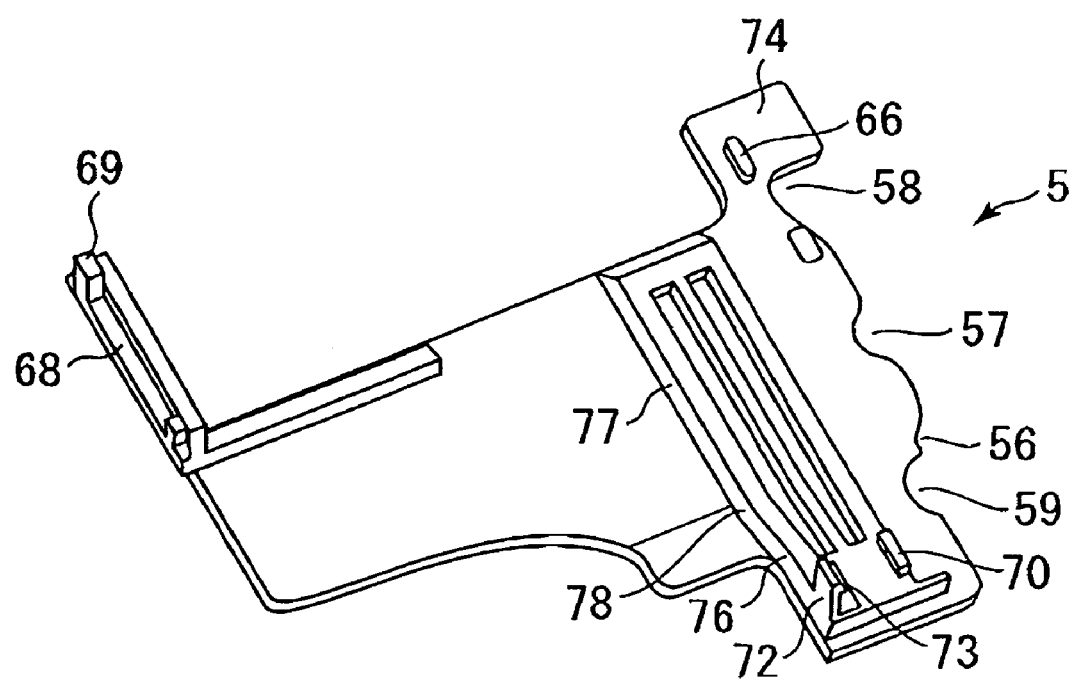
FIG. 8 is a perspective view of the back side of the sliding holding member.

The sliding holding member will be described in detail with reference to FIGS. 7 and 8. FIG. 7 is a plan view of the front side of the sliding holding member, and FIG. 8 is a perspective view of its back side. The sliding holding member 5 may be integral-molded from a resin or the like.

1) Chamfering

To facilitate insertion of the SIM card into the SIM card slot or removal of the SIM card from the SIM card slot, particularly the edge 50 on the SIM card slot 11 side of the sliding holding member 5 is chamfered along the direction in which the SIM card is inserted into the opening 113 (refer to FIG. 3) of the SIM card slot 11 (or the SIM card is removed from the opening 113). That is, the surface of the edge 50 is inclined.

2) Grip Grooves

On the sliding holding member 5, grip grooves 52 are provided in a portion where the fingers of a user touch when he slides the sliding holding member 5, as antislips for the fingers of the user. Further, in the surface area of the sliding holding member 5, an area in which the fingers of the user apply force when he slides the sliding holding member 5 is considered to be primarily an area on the spring lever 353 side. Thus, an area other than the area, i.e., a portion (portion indicated by a dashed line) 54, is omitted so as to prevent the user from hooking the fingers to the portion involuntarily or from grabbing the portion intentionally and thereby detaching the sliding holding member 5.

3) Nearly Semicircular Curves

In correspondence to the spring lever 353 of the card housing 3, three nearly semicircular curves 56, 57 and 58 are formed on a side of the sliding holding member 5 along the sliding direction. In response to sliding of the sliding holding member 5, the side face of the circular tab 354 on the top of the spring lever 353 engages these three curves 56, 57 and 58 successively by the elastic force of the spring lever 353, thereby holding the sliding holding member 5 at the MMC card slot opened position, the home position and the SIM card slot opened position, respectively. At each of the above positions, the sliding holding member 5 is held by a predetermined elastic force of the spring lever 353. As is obvious, when the circular tab 354 engages each of the nearly semicircular curves 56, 57 and 58, a user can feel clicking of given intensity by the elastic force of the spring lever 353. In particular, since the nearly semicircular curve 57 for holding the sliding holding member 5 at the home position is rather deeper than the other semicircular curves 56 and 58, the user can feel clicking of higher intensity. In contrast, since the nearly semicircular curves 56 and 58 are rather shallower than the nearly semicircular curve 57, the user can disengage the sliding holding member 5 from these nearly semicircular curves 56 and 58 smoothly. Please also note that a portion 56' between the curves 56 and 57 and a portion 57' between the curves 57 and 58 are also curved. The reason is that since the pressing force of the spring lever 353 changes by displacement, sliding force gradually increases on a straight slope, when those vectors in the sliding direction are taken into consideration. In contrast, when the portions 56' and 57' between the curves are curved as in the present invention, force required to slide the sliding holding member can be equalized. The lowermost nearly semicircular curve 59 is provided merely for preventing a portion of the sliding holding member 5 from interfering with attachment of the sliding holding member 5 to the card housing 3 and is not intended for engagement with the spring lever 353. Further, the semicircular curve 59 has such a shape simply because it does not interfere with attachment of the sliding holding member 5 to the card housing 3.

4) Horseshoe-Shaped Protrusions on a surface of the sliding holding member 5, a horseshoe-shaped protrusion 60 and a cylindrical protrusion 62 (also shown in FIG. 9 and other drawings to be described later) are provided. When the rear cover 7 is secured after the sliding holding member 5 is attached to the card housing 3, these protrusions 60 and 62 engage predetermined pits (not shown) of the rear cover 7, and a predetermined portion of the cover 7 is pressed from above along the internal positions of these protrusions 60 and 62, i.e., positions indicated by a line 64. As a result, the sliding holding member 5 is positioned at a predetermined position on the rear cover 7, and it is also effectively prevented that the sliding holding member 5 falls off the card housing 3.

5) Guide Plate, Attachment Guiding Protrusion, Guide Protrusion, and Holding Hook In correspondence to the first guide rail 346, the first guide slit 300, the second guide rail 380 and the second guide slit

382 (refer to FIG. 6), four protrusions, i.e., a first guide protrusion 66, a guide plate 68, a second guide protrusion 70 and a J-shaped holding hook 72, are formed on the sliding holding member 5, respectively. Particularly, please note that the first guide protrusion 66 is formed in a pressing section 74. This point is important from the viewpoint of a relationship with the locking lever 350 (front-side locking tab 352) of the card housing 3 which will be described later.

Of these protrusions, the first guide protrusion 66 and the second guide protrusion 70 are merely protruded vertically from the sliding holding member 5. The first guide protrusion 66 and the second guide protrusion 70 can slide on the first guide rail 346 and second guide rail 380 of the card housing 3, respectively. Meanwhile, the guide plate 68 extends in a horizontal direction, and the holding hook 72 has a portion 73 which also extends in the horizontal direction. When the sliding holding member 5 is completely attached to the card housing 3, the guide plate 68 and the holding hook 72 can slide in the first guide slit 300 and the second guide slit 382 with the horizontally extending portions engaging the above openings of the card housing 3.

As is obvious, the sliding holding member 5 can be positioned, slid and held on the card housing 3 at these four protrusions, or three protrusions which form a nearly triangular shape because the second guide protrusion 70 and the holding hook 72 can be considered substantially the same protrusion. Accordingly, as described above, the above positioning and the like can be conducted with some flexibility.

Of these protrusions, the first guide protrusion 66, the second guide protrusion 70 and the holding hook 72 are useful for positioning between the sliding holding member 5 and the card housing 3 when the sliding holding member 5 is attached to the card housing 3. Although the guide plate 68 is not directly associated with the positioning, an attachment guiding protrusion 69 provided at the top of the guide plate 68 serves this purpose. The attachment guiding protrusion 69 is used solely for this positioning and does not contribute to sliding.

6) Retracted Section

On a wall that extends in a vertical direction continuously from the holding hook 72, a flat section 77 that is parallel to the sliding direction of the sliding holding member and a retracted section 76 which is slightly inclined to the sliding direction of the sliding holding member are formed.

The retracted section 76 and the flat section 77 are useful for holding the MMC card in the MMC card slot by predetermined force. More specifically, the retracted section 76 and the flat section 77 are in direct contact with a predetermined wall of the MMC card and can sandwich the MMC card between a predetermined wall (i.e., a wall inside the opening 133 with which the MMC card may collide when the MMC card is inserted into the opening 133 of the MMC card slot) of the portable telephone and themselves and hold the MMC card by predetermined force, except for when the sliding holding member 5 is positioned at the MMC card slot opened position. The retracted section 76 is disposed closer to the front side than the flat section 77. That is, the retracted section 76 is disposed on the side where it makes direct contact with the MMC card first when the sliding holding member 5 is moved from the MMC card slot opened position. Further, the direction of inclination of the retracted section 76 is a direction which moves away from the above predetermined wall of the portable telephone (the same applies to a case when it is viewed from a wall of the MMC card housed in the MMC card slot 13) in the direction from the MMC card opened position toward the home position (SIM card opened position).

The retracted section 76 and the flat section 77 are useful for fine adjustment of force to hold the MMC card. The reason is as follows. That is, when the MMC card is held by the retracted section 76, the MMC card is held in a relatively narrow width between the retracted section 76 and a predetermined wall of the portable telephone more securely, while when the MMC card is held by the flat section 77, the MMC card is held in a relatively wide width between the flat section 77 and a predetermined wall of the portable telephone more loosely.

Further, since the boundary 78 between the retracted section 76 and the flat section 77 is relatively gently continuous, the user does not feel that the sliding holding member 5 has collided with the MMC card when a state in which the MMC card is held by the retracted section 76 is switched to a state in which the MMC card is held by the flat section 77.

4. Operation

The operation of the card holding mechanism will be described with reference to FIGS. 9 to 17. FIG. 9 and FIG. 10, FIG. 11 and FIG. 12, and FIG. 16 and FIG. 17 are paired up, respectively, and FIGS. 13 to 15 form a group. These drawings show the relationship between the card housing and the sliding holding member along with passage of time.

Figure 9:
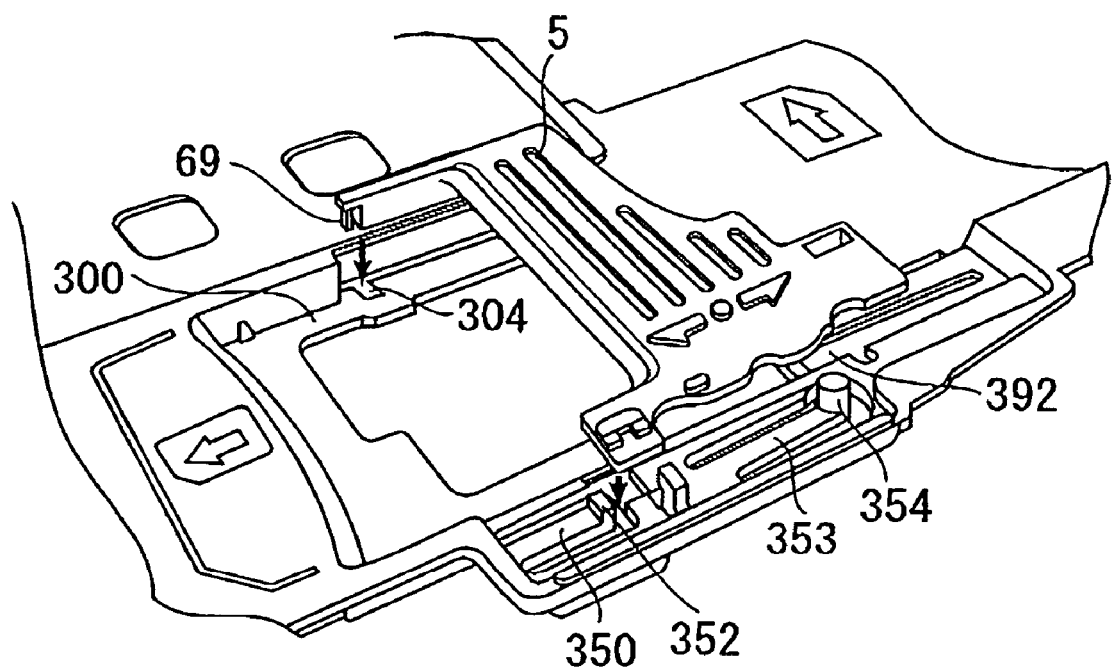
FIG. 9 is a perspective diagram showing a state in which the sliding holding member is about to be attached to the card housing.
Figure 10:
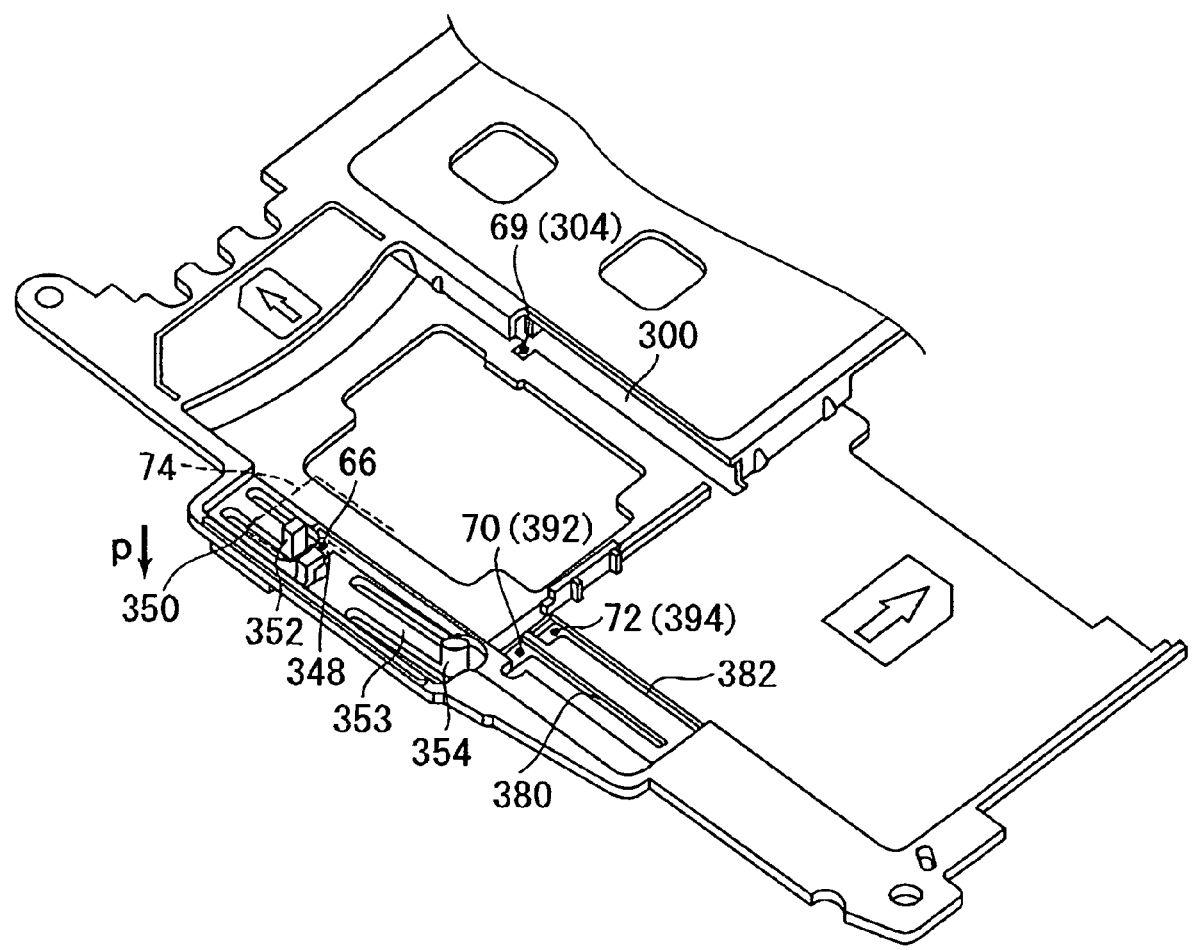
FIG. 10 is a diagram showing the positions, in the card housing, of the attachment guiding protrusion, first guide protrusion, second guide protrusion and holding hook of the sliding holding member when the sliding holding member has just been attached to the card housing.

FIG. 9 is a perspective diagram showing a state in which the sliding holding member is about to be attached to the card housing. FIG. 10 is a diagram showing in a simplified form the positions of the attachment guiding protrusion, first guide protrusion, second guide protrusion and holding hook of the sliding holding member in the card housing when the sliding holding member has just been attached to the card housing.

As is obvious from these drawings, when the sliding holding member is about to be attached to the card housing 3, the attachment guiding protrusion 69, the second guide protrusion 70 and the holding hook 72 are positioned nearly right above the attachment guiding sections 304, 392 and 394 of the first guide slit 300, second guide rail 380 and second guide slit 382 of the card housing, respectively. Therefore, when the sliding holding member is brought closer to the card housing 3 in this state, these attachment guiding protrusion 69, second guide protrusion 70 and holding hook 72 are guided to the attachment guiding sections 304, 392 and 394 smoothly, respectively.

Meanwhile, the first guide protrusion 66 is positioned slightly away from the attachment guiding section 348, i.e., not nearly right above the attachment guiding section 348 but in the vicinity of the front-side locking tab 352 of the locking lever 350. Therefore, even if the sliding holding member is brought closer to the card housing 3 in this state, the first guide protrusion 66 is not guided to the attachment guiding sections 348. However, such a positional relationship is applied simply because of installation of the locking lever 350 and is not significant. It should be noted that the pressing section 74 (indicated by a dotted line) having the first guide protrusion 66 is positioned above the front-side locking tab 352, i.e., at a position where it may collide with the front-side locking tab 352. By positioning the pressing section 74 at such a position, the front-side locking tab 352 is pressed downward, i.e., in the direction of an arrow (p) shown in FIG. 10, by the pressing section 74, as the sliding holding member 5 approaches the card housing 3. As a result, the front-side locking tab 352 is gradually moved downward.

Figure 11:
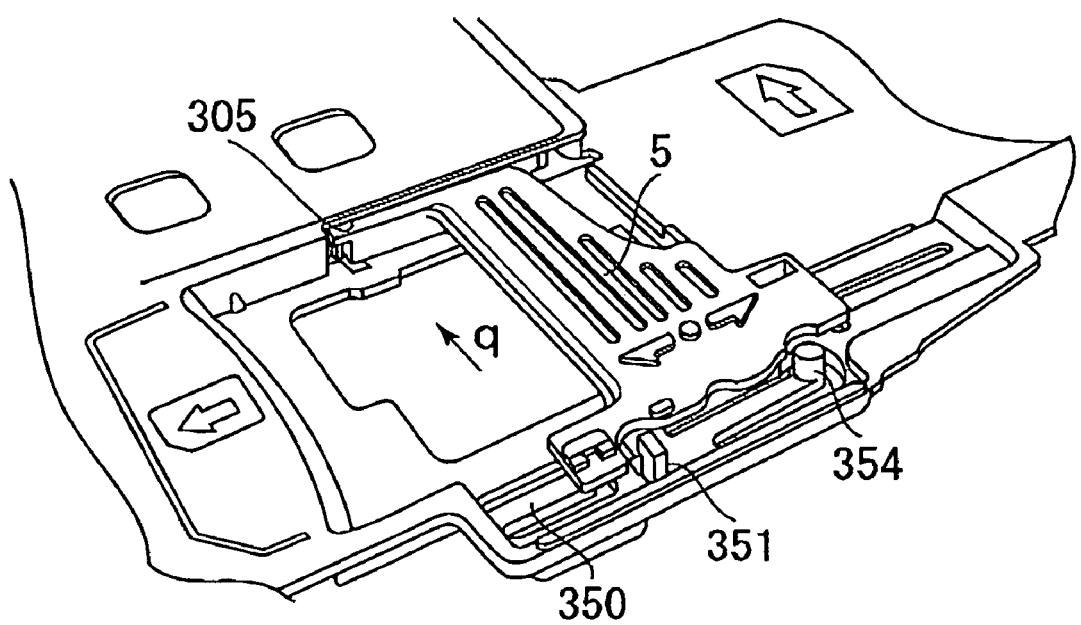
FIG. 11 is a perspective diagram showing a state in which the sliding holding member has been slid in a transverse direction.
Figure 12:
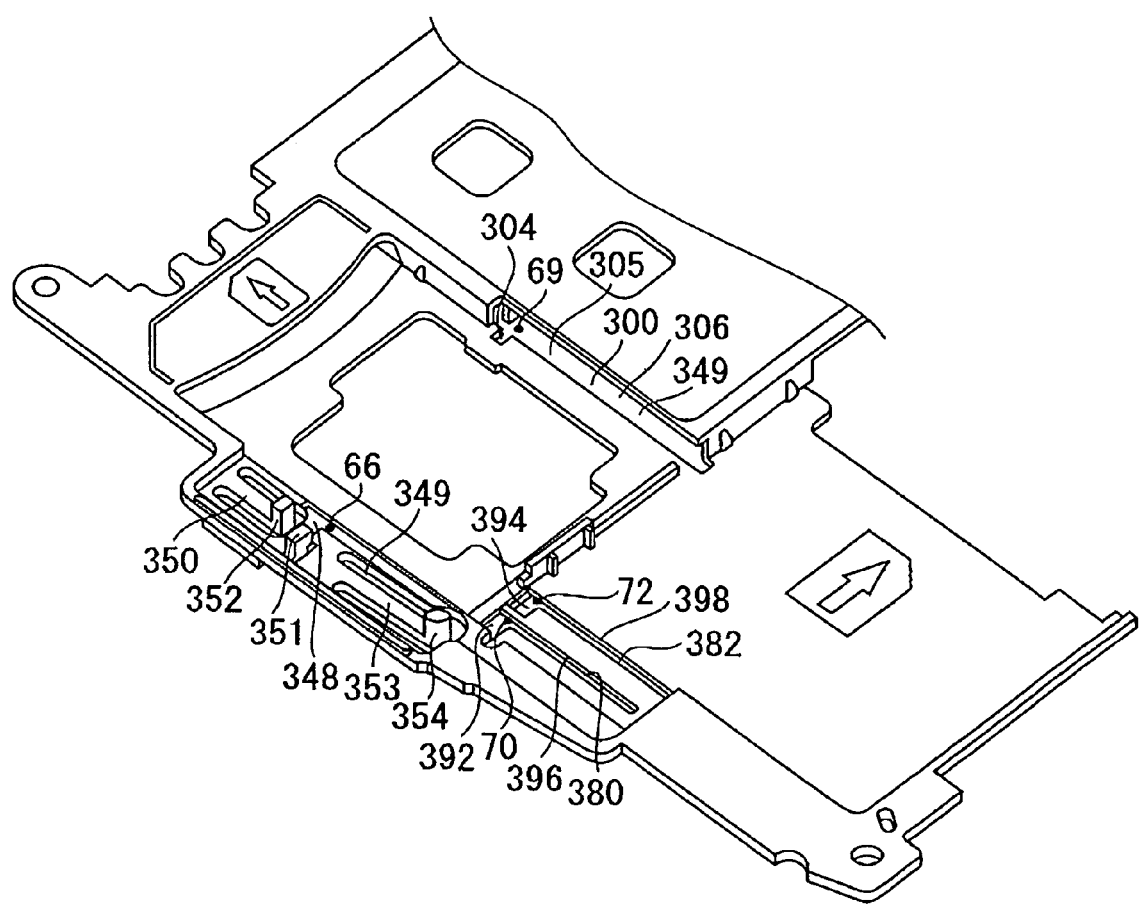
FIG. 12 is a diagram corresponding to FIG. 10 in the state shown in FIG. 11.

FIG. 11 is a perspective diagram showing a state in which the sliding holding member is slid in a transverse direction, i.e., in the direction of an arrow (q) shown in FIG. 11, with the front-side locking tab moved downward to a sufficient extent. FIG. 12 is a diagram corresponding to FIG. 10.

As is clearly shown in FIG. 11, in response to the transverse sliding, the first guide plate 68 of the sliding holding member 5 slips under the electronic module forming section 30, i.e., slips into the opening 305 formed by the electronic module forming section 30 and the SIM card slot forming section 34. As a result, one side of the sliding holding member 5 is held by the card housing 3.

Further, as is clearly shown in FIG. 12, in response to the above transverse sliding, the attachment guiding protrusion 69, first guide protrusion 66, second guide protrusion 70 and holding hook 72 of the sliding holding member 5 move from the attachment guiding sections 304, 348, 392 and 394 to the corresponding slide guiding sections 306, 349, 392 and 398, nearly simultaneously. Thereby, the first guide protrusion 66 is fitted into the corresponding attachment guiding section 348 of the first guide rail 364 for the first time and slid to the sliding guiding section 349. Even in the state shown in these drawings, the front-side locking tab 352 remains pressed downward.

Figure 13:
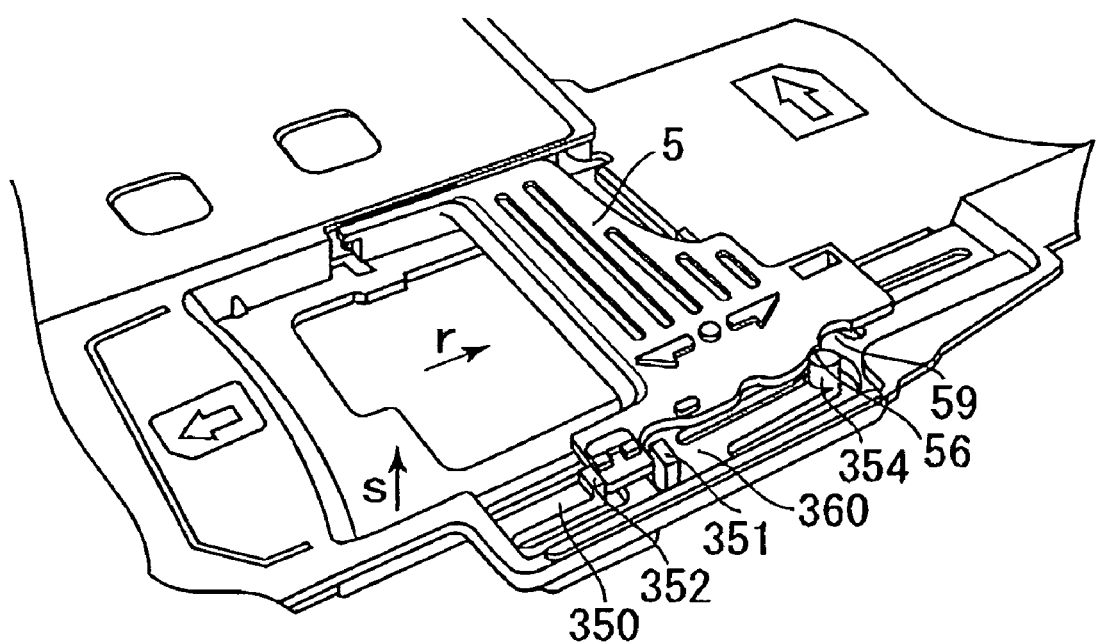
FIG. 13 is a perspective diagram showing a state in which the sliding holding member has been slid in a longitudinal direction.
Figure 14:
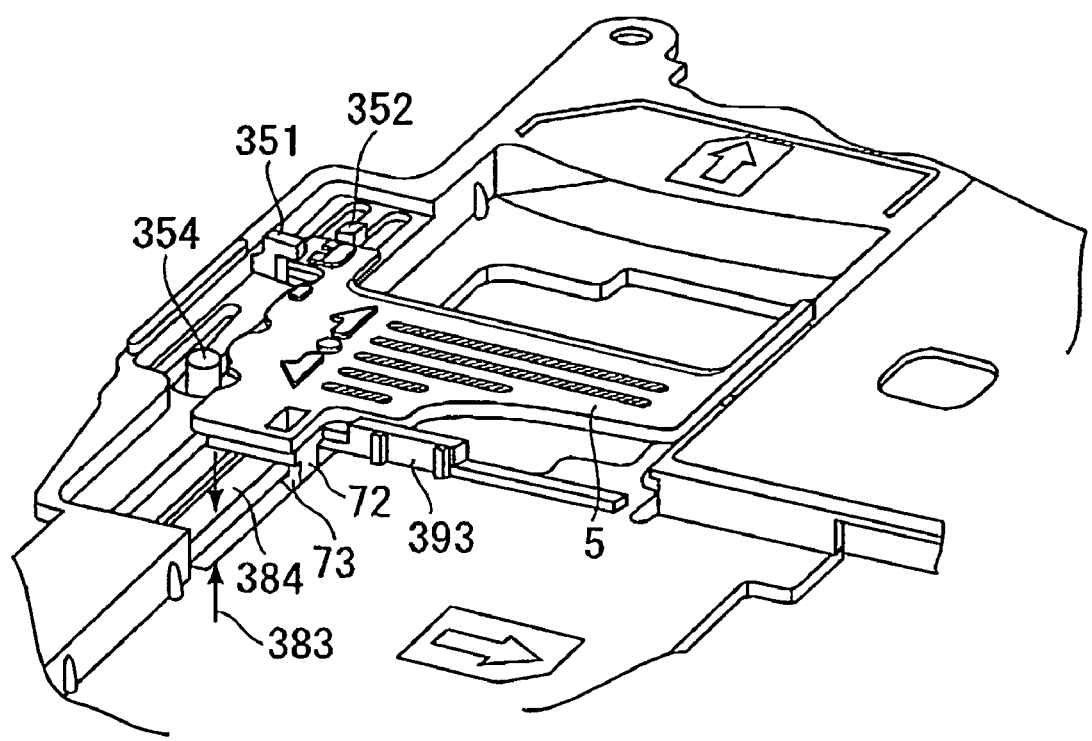
FIG. 14 is a perspective diagram viewing the state of FIG. 13 from a different angle.
Figure 15:
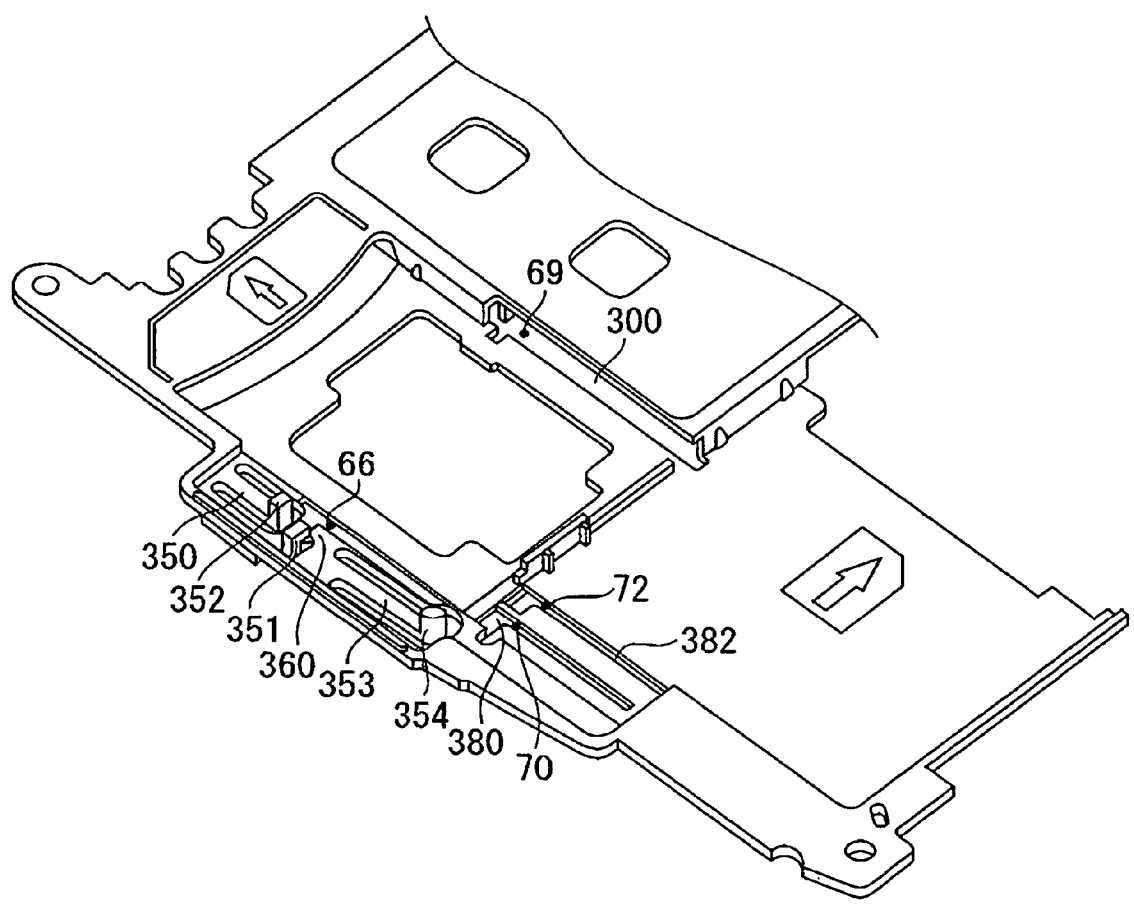
FIG. 15 is a diagram corresponding to FIG. 10 in the state shown in FIG. 13.

FIG. 13 is a perspective diagram showing a state in which the sliding holding member is slid in a longitudinal direction, i.e., in the direction of an arrow (r) shown in FIG. 13, from the state shown in FIGS. 11 and 12, and completely attached to the card housing. FIG. 14 is a perspective diagram viewing the above state from a different angle. FIG. 15 is a diagram corresponding to FIG. 10. The position of the sliding holding member shown in these drawings corresponds to the above MMC card slot opened position.

As is clearly shown in FIG. 13, in response to the longitudinal sliding, the pressing section 74 pressing the locking lever 350 of the card housing 3 downward moves away from the front-side locking tab 352, whereby the locking lever 350 snaps back in the direction of an arrow (s) shown in FIG. 13. As a result, the top of the front-side locking tab 352 of the locking lever 350 is positioned close to the upper edge of the pressing section 74, thereby preventing the sliding holding member 5 form sliding back to the position where the sliding holding member 5 is detached from the card housing 3, i.e., preventing the sliding holding member 5 from sliding in the direction opposite to the direction of the arrow (r) shown in FIG. 13 again. In this case, even if a user attempts to slide the sliding holding member 5 in the direction opposite to the direction of the arrow (r) shown in FIG. 13, the pressing section 74 of the sliding holding member 5 collides with the front-side locking tab 352. Therefore, unless the front-side locking tab 352 is moved downward again, the sliding holding member 5 is not slid in such a direction. To prevent the front-side locking tab 352 from being moved downward again, the above back-side locking tab is used after completion of assembling of the portable telephone.

Further, in response to the longitudinal sliding, a portion of the pressing section 74 slips in between the lower flat plate 360 and holding rib 351 of the card housing 3. As a result, the sliding holding member 5 is held not only at one side held by the opening 305 but also at its opposed side held by the card housing 3. Further, since the circular tab 354 of the spring lever of the card housing 3 engages the nearly semicircular curve 56 of the sliding holding member 5 at that time, the sliding holding member 5 is held at this position by predetermined force.

Further, as is clearly shown in FIG. 14, in response to the longitudinal sliding, the holding hook 72, particularly its horizontally extending portion 73, slips into the opening 383 formed by the flat protruding section 384 and MMC card slot forming section 38 of the card housing 3, particularly, under the flat protruding section 384. As a result, the sliding holding member 5 is held by the card housing 3 in this portion as well.

Further, as is clearly shown in FIG. 14, a supporting rib 393 is provided at a position where considerable force is to be applied from the sliding holding member 5, i.e., near the boundary between the MMC card slot forming section 38 and the SIM card slot forming section 34 of the card housing 3. By having the supporting rib 393, the sliding holding member 5 is supported securely on the underside thereof. Hence, even if a user applies considerable force to the sliding holding member 5 to slide it, the sliding holding member 5 or the SIM card 110 or MMC card 130 which lies thereunder is not broken by the pressing. Further, since both sides of the sliding holding member 5 are supported securely by the card housing 3, the user can slide the sliding holding member 5 at ease.

Figure 16:
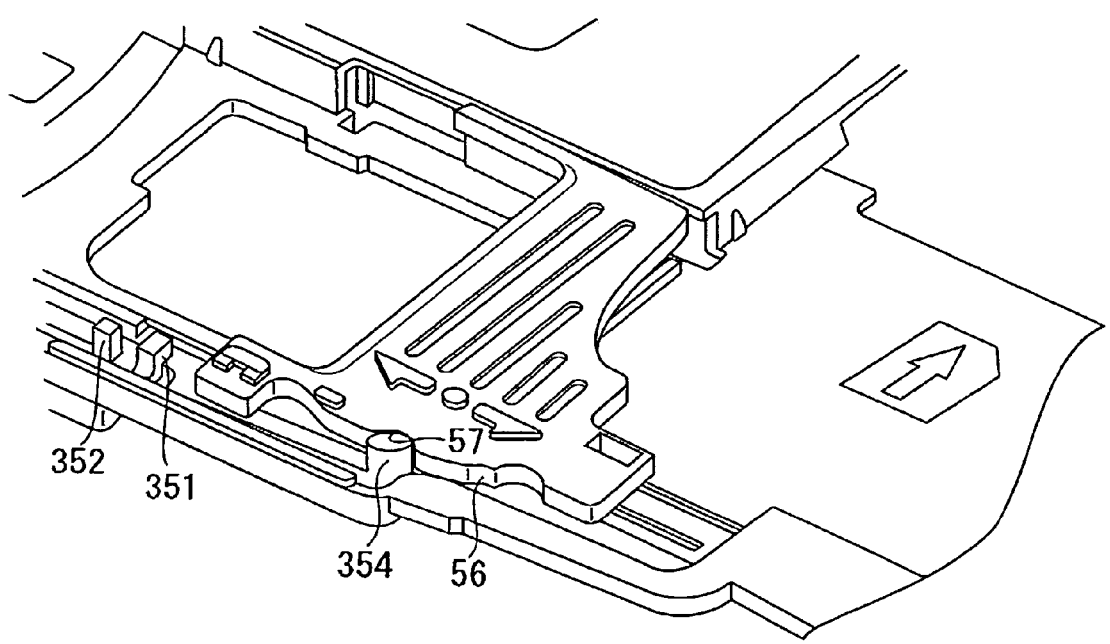
FIG. 16 is a perspective diagram showing a state in which the sliding holding member has been further slid in the longitudinal direction.
Figure 17:
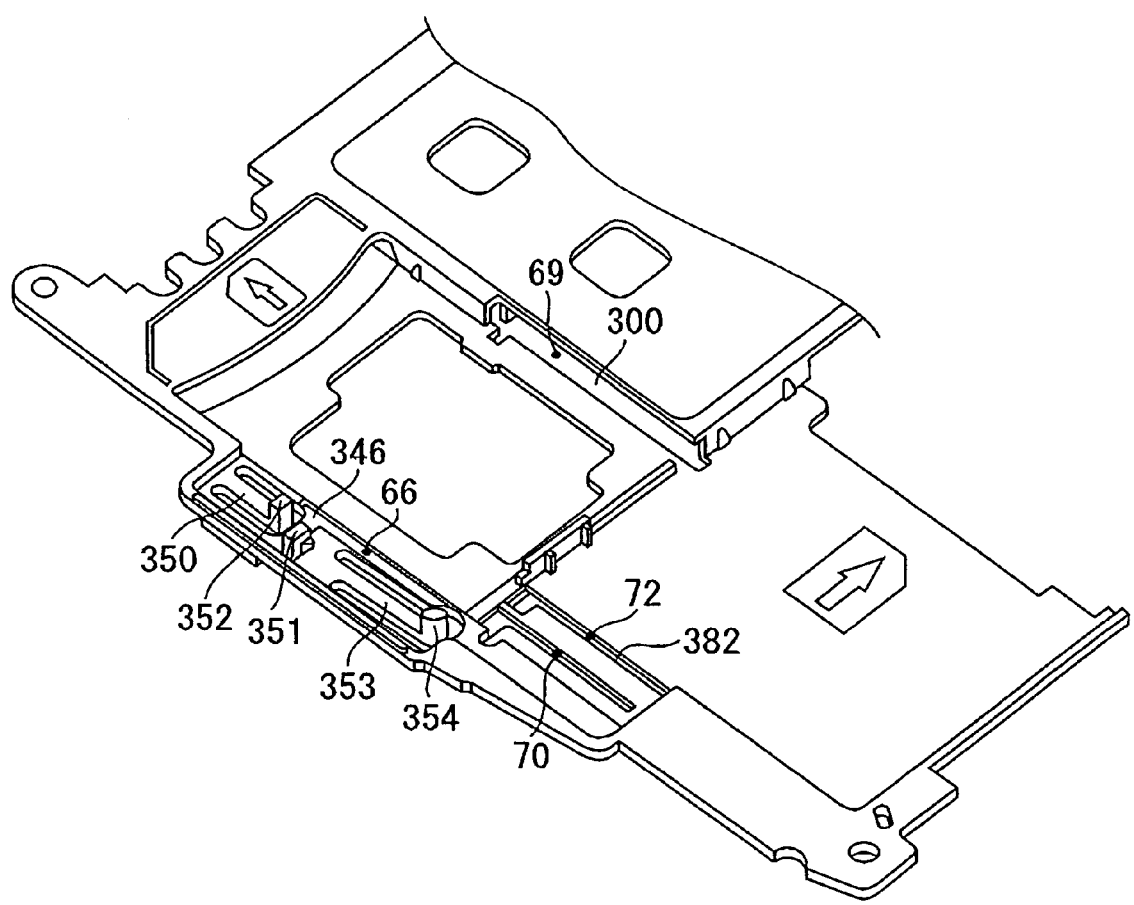
FIG. 17 is a diagram corresponding to FIG. 10 in the state shown in FIG. 16.

FIG. 16 is a perspective diagram showing a state in which the sliding holding member has been further slid in the longitudinal direction. FIG. 17 is a diagram corresponding to FIG. 10. The position of the sliding holding member shown in these drawings corresponds to the above home position.

Along with the longitudinal sliding of the sliding holding member 5, the circular tab 354 of the spring lever moves from the nearly semicircular curve 56 toward the nearly semicircular curve 57 while contacting a side of the sliding holding member 5 by predetermined elastic force and snaps in the nearly semicircular curve 57 when reaching a certain position. As a result, the sliding holding member 5 is held at this position by predetermined force. A description will not be given with respect to the SIM card slot opened position since it is assumed to be obvious from the above description.

According to the present invention described above, an apparatus having a card holding mechanism which can hold two cards at the same time can be provided.

In the above embodiment, the sliding holding member has been described as a member formed independently of the apparatus. However, the sliding holding member may be integrated with the apparatus.

What is claimed is:

1. An apparatus having a card holding mechanism, wherein the card holding mechanism comprises:
   a first card housing section having a holding section which holds one end of a first card, a second card housing section having a holding section which holds one end of a second card, and a sliding holding section which can hold the end opposite to the one end of the first card housed in the first card housing section and the end opposite to the one end of the second card housed in the second card housing section simultaneously, the sliding holding section can slide among:
   a first position at which the sliding holding section holds the opposite end of the first card housed in the first card housing section and also holds the opposite end of the second card housed in the second card housing section,
   a second position at which the sliding holding section leaves
   the second card housing section open to make it possible to house the second card while holding the opposite end of the first card housed in the first card housing section,
   and a third position at which the sliding holding section leaves the first card housing section open to make it possible to house the first card while holding the opposite end of the second card housed in the second card housing section.

2. An apparatus having a card holding mechanism, wherein the card holding mechanism comprises:
   a first card housing section having a nearly concave shape and having an opening for holding one end of a first card, a second card housing section having a nearly concave shape and having an opening for holding one end of a second card, and a sliding holding member which is positioned above the first card housing section and the second card housing section and provided independently of the first card housing section and the second card housing section and which can hold the end opposite to the one end of the first card housed in the first card housing section and the end opposite to the one end of the second card housed in the second card housing section Simultaneously, the sliding holding member can slide between the first card housing section and the second card housing section, nearly parallel to the one end and opposite end of the first card and nearly vertically to the one end and opposite end of the second card, and the sliding holding member can slide among:

a first position at which the sliding holding member holds the opposite end of the first card housed in the first card housing section and also holds the opposite end of the second card housed in the second card housing section;

a second position at which the sliding holding member leaves the second card housing section open to make it possible to house the second card while holding the opposite end of the first card housed in the first card housing section, and a third position at which the sliding holding member leaves the first card housing section open to make it possible to house the first card while holding the opposite end of the second card housed in the second card housing section.

3. The apparatus according to claim 2, wherein the sliding holding member holds the opposite end of the first card over a full width and holds the opposite end of the second card only over a partial width.

4. The apparatus according to claim 2, wherein the sliding holding member is chamfered along the direction in which the first card is inserted into the opening of the first card housing section.

5. The apparatus according to claim 2, wherein a portion of an area other than an area to which the fingers of a user mostly apply force when the user slides the sliding holding member is omitted from the sliding holding member.

6. The apparatus according to claim 2, wherein the edges of the opening of the first card housing section protrude in a curved form in the direction opposite to the direction in which the first card is inserted into the opening of the first card housing section.

7. The apparatus according to claim 2, wherein the sliding holding member is provided with a supporting section which supports the underside of the sliding holding member, on the underside of the sliding holding member.

8. The apparatus according to claim 2, wherein the sliding holding member has antislips.

9. The apparatus according to claim 2, wherein the sliding holding member is held on the apparatus at three spots which form a nearly triangular shape.

10. The apparatus according to claim 2, wherein the sliding holding member is brought close and attached to the apparatus and has protrusions which can engage pits provided in a portion of the apparatus when the apparatus is assembled.

11. The apparatus according to claim 2, wherein the sliding holding member has curves corresponding to the first, second and third positions, and an elastic member provided on the apparatus engages each of the curves at the first, second or third position according to sliding of the sliding holding member.

12. The apparatus according to claim 11, wherein the curve which engages the elastic member at the first position is deeper than the curves which engage the elastic member at the second and third positions.

13. The apparatus according to claim 2, wherein the sliding holding member has a wall which is in direct contact with a predetermined wall of the second card housed in the second card housing section and can hold the card in the second card housing section by predetermined force, except for at least when the sliding holding member is positioned at the second position, in the direction perpendicular to a slide face which can be formed by the sliding holding member when the sliding holding member slides, and on the wall, a flat section parallel to the sliding direction of the sliding holding member and a retracted section which is inclined in a direction which moves away from the predetermined wall of the second card when the sliding holding member is slid from the second position are formed continuously.

14. The apparatus according to claim 13, wherein the boundary between the flat section and the retracted section is gently continuous.

15. The apparatus according to claim 2, wherein the sliding holding member is brought close and attached to the apparatus, in the direction perpendicular to a slide face which can be formed by the sliding holding member when the sliding holding member slides, and the apparatus has a horizontal portion extending parallel to the slide face at a position remote in the perpendicular direction from the apparatus, and after the sliding holding member is brought close to the apparatus in the perpendicular direction, the sliding holding member is slid in the sliding direction, whereby the sliding holding member is sandwiched and held between the horizontal portion and the apparatus.

16. The apparatus according to claim 15, wherein the apparatus has an elastic member which can be elastically displaced in the perpendicular direction, the elastic member collides with the sliding holding member and is displaced in the perpendicular direction when the sliding holding member is brought close to the apparatus in the perpendicular direction, and then, when the sliding holding member is slid and sandwiched between the horizontal portion and the apparatus, the elastic member disengages from the sliding holding member and returns to the original position so as to prevent the sliding holding member from sliding back in the sliding direction.

17. An apparatus having a card holding mechanism, wherein the card holding mechanism comprises:

a first card housing section which can hold one end of a first card, a second card housing section which can hold one end of a second card, and a sliding holding section which can hold the end opposite to the one end of the first card housed in the first card housing section and the end opposite to the one end of the second card housed in the second card housing section simultaneously, wherein the sliding holding section holds the opposite end of the first card over a full width and holds the opposite end of the second card only over a partial width.

18. The apparatus according to claim 1, wherein the sliding holding section holds the opposite end of the first card over a full width and holds the opposite end of the second card only over a partial width.

* * * * *